Patented Aug. 19, 1947

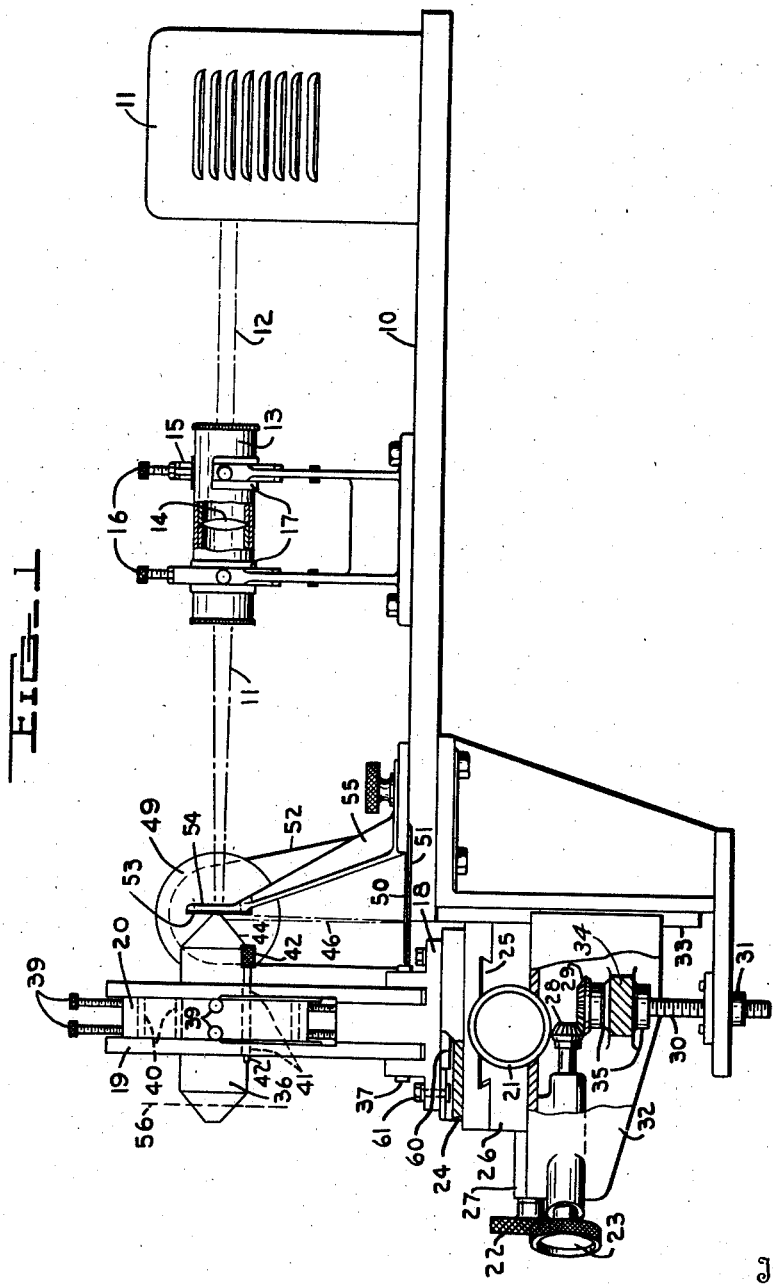

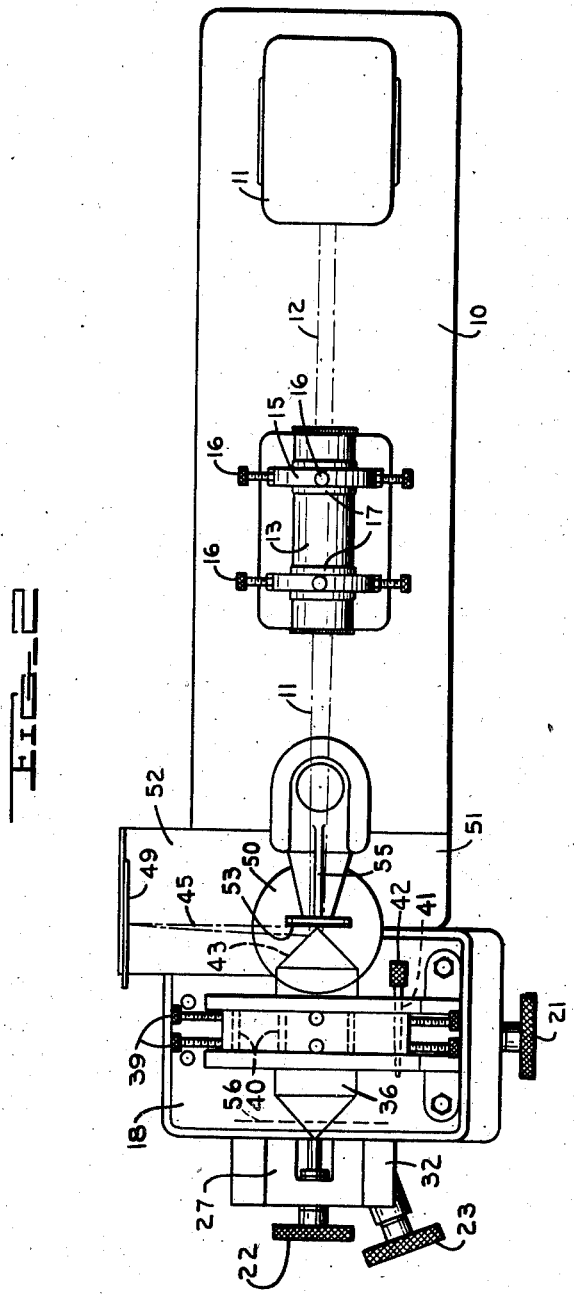

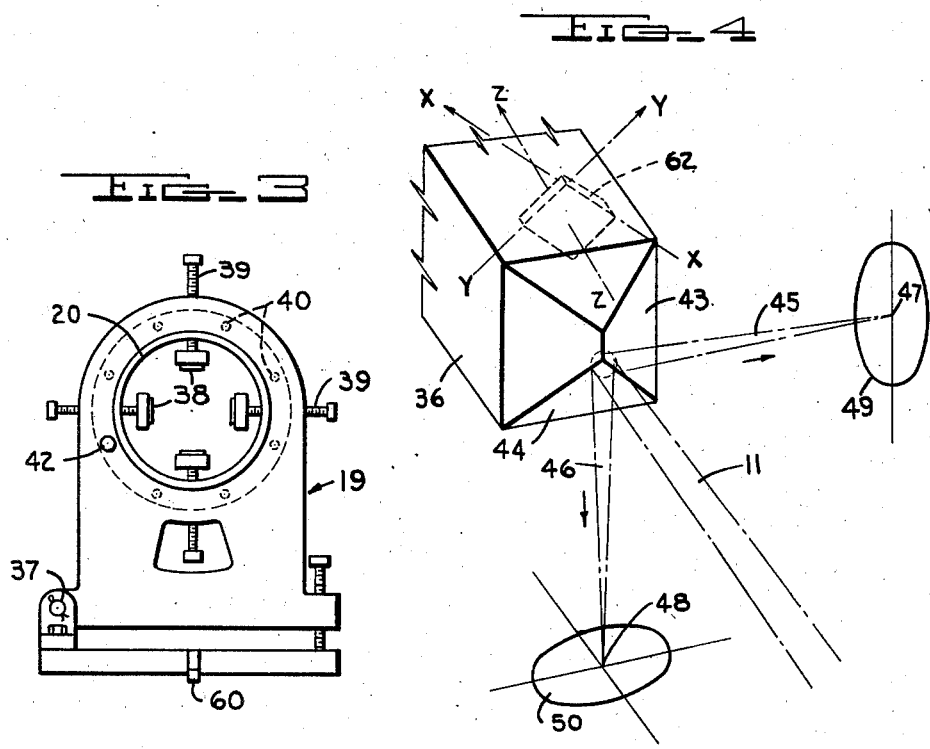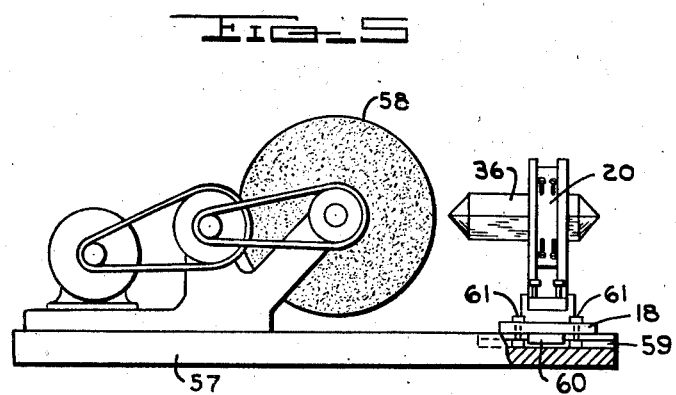

2,425,750

UNITED STATES PATENT OFFICE 2,425,750

OPTICAL ALIGNER

John O. McCarty, United States Navy

Application June 14, 1945, Serial No. 599,496

5 Claims. (Cl. 51—277)

(Granted under the act of March 3, 1883, as amended April 30, 1928; 370 O. G. 757)

The present invention relates to the art of cutting crystals with reference to their natural structure, for the efficient utilization of characteristics bearing a definite directional relation to certain of the natural axes of the crystal, and relates more particularly to the preparation of piezo-electric crystal elements.

An object of the invention is to provide a simple, accurate and rapid method of aligning a crystal and a cutting tool with reference to the natural structure of the crystal.

Another object is to provide a means for rapidly and accurately indicating alignment of certain axes of a crystal, with reference to a holder in which the crystal may be clamped for operation on the crystal by a cutting tool.

Another object is the provision of a means and method whereby a definite geometrical relation which certain natural facets of the crystal bear to certain of its piezo-electric axes, and the goniometric accuracy of a reflected light beam, are utilized in the establishment of a definite angular relation between certain axes of crystal and a crystal holder.

Various other objects and advantages of the invention will become apparent from a perusal of the following specification and the drawings accompanying the same.

Fig. 1 is a side elevation of an apparatus for carrying out my invention.

Fig. 2 is a plan view of the same.

Fig. 3 is a front elevation of the crystal holder and carriage looking from the right in Figs. 1 and 2.

Fig. 4 is a diagrammatic perspective view showing the relation of the beam, the crystal and the target spots.

Fig. 5 is a side elevation on a much reduced scale and in diagrammatic form, showing the crystal holder with crystal orientated therein and in operative relation with a cutting tool.

Referring to the drawings in detail, the invention provides an aligning bench or bed 10 on which is mounted a light-beam source 11 of any known or other suitable form for directing a light-beam 12 through lens tube 13 containing a suitable lens 14 arranged to focus the beam to a small focused spot at a given focal distance. To fix the beam in given angular relation to the aligning bed 10 in the present instance parallel to the longitudinal direction of extension or axis of the bed, the lens tube 13 is adjustably mounted in a pair of spaced, ring supports 15 by means of a set of four adjustable clamping screws 16 in each ring support, threaded in the ring support and bearing radially inwardly against the bands 17 on the tube along 90° radii. It will be obvious how by suitable manipulation of the adjustable clamping screws 16, the lens tube 13 may be adjusted to accurately align the beam with the bed.

A carriage element 18 removably mounted on the bed 10 in fixed angular relation to the latter, carries a support 19 which in turn supports a crystal holder 20. The carriage 18 is mounted for three dimensional, straight line movement relative to the aligning bed 10 by manipulation of the three adjusting knobs 21, 22 and 23. The knob 21 operates in known manner as through the usual threaded bolt and nut arrangement, not shown, to feed the carriage-mounting 24 and with it the carriage 18, along the dove-tail way 25 transversely of the aligning bed 10. The knob 22 operates in similar known manner, not shown, to feed the transverse feed support 26, and with it the carriage mounting 24 and carriage 18 longitudinally of the aligning bed 10 along a suitable longitudinal way 27. The knob 23 operates in known manner as through bevel gears 28—29, threaded shaft 30 and fixed nut 31, to adjust the elevation of a vertically adjustable base element 32 guided by a suitable vertical way 33 fixed to the bed 10. The shaft 30 has bearing in a transverse bar 34 fixed in the base element and is held against vertical movement relative to the bar by suitable thrust-bearing collars 35.

The crystal holder 20 may be of any known or other suitable form capable of holding a crystal 36 with certain of its natural axes in given fixed orientation relative to the beam 12 and consequently the bed 10, and capable of permitting the crystal to be accurately adjusted to such position by slight adjustment about vertical and horizontal axes normal to the beam, and a rotational adjustment about an axis parallel to the beam. A very suitable holder is one of the type here shown and which comprises part of the subject of a separate application of Wilbert P. Marshall, Serial Number 601,051, filed June 22, 1945, and which matured as Patent No. 2,416,703 on March 4, 1947. It is comprised in general of a carriage element 18 on which the support 19 is pivotally mounted by means of a pintle 37 for slight rotational adjustment about an axis parallel to the longitudinal axis of the bed 10, and in which support the ring-form holder 20 is mounted for rotation about an axis parallel to the longitudinal axis of the bed. Within the ring-form crystal holder the crystal 36 is adjustably clamped with the longitudinal axis of the crystal in parallelism with the beam, such adjustment being afforded by means of the clamping shoes 38 mounted at the inner ends of the radially inwardly extending clamping screws 39. The ring-form holder is adapted to be locked in different predetermined angular positions by means of a series of openings 40 in the holder arranged to be brought into register with through-holes 41 in the support 19 to receive a locking pin 42 passed through the latter holes as indicated in Fig. 1.

The purpose of the various adjustments above described is to enable the crystal to be brought into a position where, as indicated diagrammatically in Fig. 4, two adjacent faces of the rectangular pyramidal cap-end such as the side and bottom faces 43 and 44 will each receive a portion of the incident beam 12 and direct a reflected portion 45 or 46 onto one of the target spot areas 47 and 48 respectively, to cause each of the reflected beams 45 and 46 to be brought to a focus at their respective target spots. The target spots 47 and 48 constitute portions of a pair of target plates 49 and 50 mounted on a target bracket having a horizontal portion 51 secured to the bed 10 and a vertical portion 52 arranged to support the target plates in positions to locate each of the target spots at points each such that the sum of its distance from the point of reflection from the crystal, plus the distance from the latter point to the lens will be substantially equal to the focal length of the lens. To aid in adjustment of the crystal to bring about the above condition, a stop plate 53 of transparent material such as sheet Celluloid is situated intermediate the path of the beam approximately in that vertical plane to which the forward end of the crystal cap should be brought to cause the reflected beams to focus properly on their respective target spots. The transparent stop plate 53 is supported in place by the circular frame element 54 to which it is cemented, the frame element being supported on the bed 10 by a suitable bracket 55.

An illustrative manner of setting up the device to bring about the cooperative relation of parts above mentioned is as follows: Having selected a lens 14 with a focal length approximately equal to the distance from a point approximately midway between the light-beam source 11 and the frame element 54, plus the distance from the center of the frame element to the target plate 50, and before the stop plate 53 and carriage 18 are installed, a target surface element, not shown, is positioned in a plane indicated by the dotted line 56 in Fig. 1, at approximately the focal distance from the lens, after which the position of the lens 55 is adjusted to bring the beam 12 to a focus at the plane 56. The frame element 54 is then adjusted to bring the left hand surface of the stop element 53 to a distance from the plane 56 equal to the height of the beam from the target spot area 48. The transparent stop element is then marked with a pair of cross-lines crossing at its center and cemented to the frame element with the intersection of the cross lines carefully positioned in the center of the beam.

The apparatus as thus set up is adapted for effecting an alignment of a crystal of the general form shown in Fig. 4, which is that of a rectangular prism having a rectangular pyramidal cap-end with facets such as 43 and 44 lying at substantially 45 degrees to the longitudinal or optical axis Z of the crystal, and which crystal exhibits desirable mechanical effects along axes X and Y at right angles to each other and to the optical axis, and canted at 45 degrees to the sides of the crystal.

With a crystal of the above geometrical characteristics, it will be clear that when the crystal is adjusted in the holder to bring the reflected beam portions 45 and 46 onto their respective target spots 47 and 48, the surface 43 will lie in a plane 45 degrees to the vertical plane of the incident beam 11 and perpendicular to the horizontal plane of the beam, while the surface 44 will be in a plane 45 degrees to the horizontal plane of the beam and perpendicular to the vertical plane of the beam. The optical axis Z will lie parallel to the beam and the axes X and Y, of the derived piezo-electric effects, will lie at 45 degrees to the vertical and horizontal planes of the beam.

With the crystal clamped in the holder in this adjusted position, the carriage 18 may be removed from the aligning bench or bed 10 and placed as indicated in Fig. 5 on the bed 57 of a cutting tool 58 to bring the crystal into the same three-directional orientation with respects to the tool 58 and bed 57 as it had with the beam 11 and aligning bed 10. Alignment of the carriage with the beds 10 and 57 may be effected in any known or other suitable manner as through the usual T-slot 59, spline 60 and T-bolts 61.

In the present instance the cutting tool is a thin abrasive disk for slicing into the crystal in the plane of the disk. The angle of the plane of a cut with respect to the X and Y axes of the crystal is determined by suitable adjustment of the indexing means comprised of the openings 40 and 41 and the locking pin 42. This enables a rectangular prism to be cut from the mother crystal, having a longitudinal axis parallel to the optical axis Z of the crystal, and sides canted at 45 degrees to the sides of the crystal and from which, by transverse slicing, may be cut blocks or slabs orientated with respect to the mother crystal as indicated for the slab shown in dotted lines at 62 in Fig. 4.

While the device has been shown here as having been constructed and set for the alignment of one specific form of crystal, it is to be understood that it may be varied in construction and setting for other shapes of crystals, by positioning the target spots 47 and 48 at points to which portions of the incident beam reflected from two different facets of the crystal will be directed when the crystal is in given orientation with respect to the incident beam 12 and bed 10.

The location of the target spots for different shapes of crystals may be predetermined by application of the laws of reflection in known manner, given the angles of the crystal focus, or may be determined empirically by establishing proper alignment of a given type of crystal or model thereof by means of suitable mechanical measurements, with the crystal or model positioned to receive the incident beam on two different faces, and fixing the target spots in positions each to receive one of the two focused, reflected beams. Other crystals of the same shape positioned to similarly split the incident beam and direct the two reflected beams each to one of the target spots, will have the same orientation with respect to the beam and holder as had the trial crystal or model.

By way of a practical application of the invention, one specific embodiment has been shown and described in detail herein, but it is to be understood that the invention is not limited to such specific embodiment and contemplates all such modifications and variations thereof as fall fairly within the scope of the appended claims.

The invention described herein may be manufactured and used by or for the Government of the United States of America for governmental purposes without the payment of any royalties thereon or therefor.

What is claimed is:

1. A device for aligning two axes of a crystal with a carriage element, the said crystal being of a type having a crystal cap or end-portion with natural faces orientated in definite relation to the axes of the crystal, comprising an aligning bed, means for mounting the carriage on the bed in fixed angular relation thereto, a light-beam source producing a light beam fixed in angular relation to said aligning bed and focused to a relatively small spot at a given focusing distance from the source, a crystal holder holding the crystal on the carriage with two adjacent faces of the crystal cap intercepting the beam at a distance from the source less than the focusing distance, to split the beam into two reflected beams extending in different directions, a pair of screen elements having target-spot portions placed in positions each to receive one of the two reflected beams when the said two transverse axes of the crystal are in a predetermined alignment with the bed and consequently the carriage element, and means for clamping the crystal in the holder in various angular positions within a substantial range of adjustment to permit the crystal to be moved into and clamped in a position to bring the reflected beams onto their respective target spots.

2. A device for aligning two axes of a crystal with a carriage element, the said crystal being of a type having a crystal cap or end-portion with natural faces orientated in definite relation to the axes of the crystal, comprising an aligning bed, means for mounting the carriage on the bed in fixed angular relation thereto, a light-beam source producing a light beam in fixed angular relation to said aligning bed and focused to a relatively small spot at a given focusing distance from the source, a crystal holder holding the crystal on the carriage with two adjacent faces of the crystal cap intercepting the beam at a distance from the source less than the focusing distance, to split the beam into two reflected beams extending in different directions, a pair of screen elements having target-spot portions placed in positions each at a distance from the source along the incident and reflected paths of the beam substantially equal to the said focal distance to receive one of the two reflected beams when the said two transverse axes of the crystal are in a predetermined alignment with the bed and consequently the carriage element, and means for clamping the crystal in the holder in various angular positions within a substantial range of adjustment to permit the crystal to be moved into and clamped in a position to bring the reflected beams onto their respective target spots.

3. A device for aligning a crystal with a carrier element, comprising a light-beam source producing a light beam fixed in angular relation to the carrier element, a crystal holder holding the crystal on the carrier with two adjacent faces of the crystal intercepting the beam to split the latter into two reflected beams extending in different directions, a pair of target elements providing target-spot areas placed in positions each to receive one of the two reflected beams when the crystal is in a predetermined alignment with the beam, and means for clamping the crystal in the holder in various angular positions within a range of adjustment to permit the crystal to be moved into and clamped in a position to bring the reflected beams onto their respective target elements.

4. The method of aligning the axes of a crystal with a cutting tool which comprises directing rays of light of fixed angular direction against two different faces of the crystal and orientating the crystal into and fixing it in position to direct two reflected beams of said light rays each beam from a different one of said faces to a different one of a pair of small target areas fixed at points to which said reflected beams will be directed upon orientation of the crystal to a predetermined position with respect to said light rays, and replacing the incident beam by said tool.

5. The method of aligning the axes of a crystal with a cutting tool which comprises directing a beam of light in fixed angular direction, orientating the crystal into a position to receive a portion of the beam on two different crystal faces and to direct two reflected beams each from one of said faces to one of a pair of target spots to which said reflected beams will be directed upon orientation of the crystal to a predetermined position with respect to said beam, securing the crystal in said orientated position, and replacing the incident beam by said tool.

JOHN O. McCARTY.

REFERENCES CITED

The following references are of record in the file of this patent:

UNITED STATES PATENTS

| Number | Name | Date |
| --- | --- | --- |
| 2,151,736 | Broughton | Mar. 28, 1939 |
| 2,352,072 | Bond | June 20, 1944 |
| 1,085,612 | Jacob | Feb. 3, 1914 |
| 2,381,993 | Baker | Aug. 14, 1945 |
| 2,326,319 | Bailey | Aug. 10, 1943 |